United States Patent
Tagami et al.

(10) Patent No.: US 7,151,751 B2
(45) Date of Patent: Dec. 19, 2006

(54) TRAFFIC GENERATION APPARATUS SUITABLE FOR USE IN COMMUNICATION EXPERIMENTS

(75) Inventors: Atsushi Tagami, Saitama (JP); Teruyuki Hasegawa, Saitama (JP); Toru Hasegawa, Saitama (JP); Kouji Nakao, Saitama (JP); Hiroki Furuya, Saitama (JP); Hajime Nakamura, Saitama (JP)

(73) Assignee: Kiddi Corporation, Tokyo (JP)

( * ) Notice: Subject to any disclaimer, the term of this patent is extended or adjusted under 35 U.S.C. 154(b) by 909 days.

(21) Appl. No.: 09/954,211

(22) Filed: Sep. 18, 2001

(65) Prior Publication Data

US 2002/0037008 A1    Mar. 28, 2002

(30) Foreign Application Priority Data

Sep. 26, 2000    (JP) ............................. 2000-292425

(51) Int. Cl.
*G01R 31/08*    (2006.01)
(52) U.S. Cl. ...................................... 370/252; 370/468
(58) Field of Classification Search ................ 370/389, 370/401, 240, 238, 391, 394, 252; 709/223
See application file for complete search history.

(56) References Cited

U.S. PATENT DOCUMENTS

| | | | | |
|---|---|---|---|---|
| 5,450,400 A | * | 9/1995 | Denissen et al. | ........... 370/391 |
| 5,640,388 A | * | 6/1997 | Woodhead et al. | ......... 370/468 |
| 6,075,773 A | * | 6/2000 | Clark et al. | .................. 370/241 |
| 6,414,942 B1 | * | 7/2002 | Ito et al. | ..................... 370/250 |
| 6,690,647 B1 | * | 2/2004 | Tang et al. | .................. 370/235 |

OTHER PUBLICATIONS

Walter Willinger et al. "Self-similarity through high-variability: Statistical analysis of Ethernet LAN Traffic at the source level", IEEE/ACM Transactions on networking, vol. 5, No. 1, pp. 71-85, Feb. 1997.*
Veitch, Darryl et al.; "On-line Generation of Fractal and MutliFractal Traffic"; *Proceeding of PAM* (Passive & Active Measurement Workshop); Apr. 3, 2000; pp. 117-126.

* cited by examiner

*Primary Examiner*—Chau Nguyen
*Assistant Examiner*—Jung Park
(74) *Attorney, Agent, or Firm*—Westerman, Hattori, Daniels & Adrian, LLP.

(57) ABSTRACT

Data of traffic with long-range dependence characteristics is generated by a host terminal and transferred to a memory arranged on a board. The memory stores the traffic data comprising at least one of the number of IP packets output per unit time and total number of bytes, a set value of each parameter of the generated IP packets (i.e., packet length table) and an IP address table. A packet generation section refers to the data in the memory to generate traffic with long-range dependence characteristics at a speed corresponding to a high-speed network. As a result, the behavior of the network at the time of application of the load can be measured before the actual use of the network. According to the present invention, a traffic generation apparatus that can supply the actual network with a load close to the real traffic can be provided.

3 Claims, 3 Drawing Sheets

| 31 | | 16 15 | 0 |
|---|---|---|---|
| VERSION 4 | LENGTH 5 | TOS 08 | TOTAL LENGTH [BYTE] |
| IDENTIFICATION | | FLAG 0 | OFFSET (13BIT) 0 |
| TTL 40 | PROTCOL 06 | HEADER CHECKSUM | |
| SOURCE IP ADDRESS | | | |
| DESTINATION IP ADDRESS | | | |

TRAFFIC GENERATION APPARATUS SUITABLE FOR USE IN COMMUNICATION EXPERIMENTS

BACKGROUND OF THE INVENTION

1. Field of the Invention

The present invention relates to a traffic generation apparatus suitable for use in communication experiments of a network built by using a high-speed communication line, such as 2.5 Gbps (OC48) or 10 Gbps (OC192), which can generate a traffic with long-range dependence characteristics.

2. Description of the Related Art

Recently, with an increase of traffic, research and experiments related to a network built by using a high-speed communication line, such as 2.5 Gbps (OC48) or 10 Gbps (OC192) have been performed. In building such a network, it is necessary to apply a load similar to the traffic of the actual network to the network beforehand, to thereby perform a communication experiment.

As conventional apparatus for generating an IP packet to be spread for the communication experiment, there have been proposed (1) an apparatus for generating an IP packet cyclically, that is, with a certain time interval; (2) an apparatus for generating an IP packet in bursts; or (3) an apparatus for generating an IP packet with a random time interval.

However, since the pattern of the IP packet generated by the above-described apparatus (1) to (3) is largely different from that of the actual traffic, there is a problem in that even if the IP packet generated by these apparatus is spread into the network, it cannot be said that a load close to the actual traffic is applied to the network. Moreover, there is a problem in that since a packet having a fixed length has heretofore been generated, it is different from an IP packet having a variable length spread to the actual network.

SUMMARY OF THE INVENTION

It is therefore an object of the present invention to solve the above-described problems in the related art and to provide a traffic generation apparatus that can supply realistic loads to the actual network.

In order to achieve the object, the first feature of the invention is that a traffic generation apparatus comprises storage means for storing at least data of traffic with long-range dependence characteristics, comprising at least one of the number of IP packets output per unit time and total number of bytes, and a set value of each parameter of the generated IP packets; and packet generation means for generating IP packets based on said data of traffic with long-range dependence characteristics stored in said storage means.

The second feature of the invention is that said storage means and said packet generation means are arranged on a board, to generate IP packets at a speed corresponding to a high-speed network.

According to this feature, it becomes possible to generate traffic having a pattern close to that of the traffic to be spread to the actual network.

According to this feature, it becomes possible to generate an IP packet of a speed corresponding to a network built by using a high-speed communication line, such as 2.5 Gbps or 10 Gbps.

DETAILED DESCRIPTION OF THE PREFERRED EMBODIMENT

Figure 1:
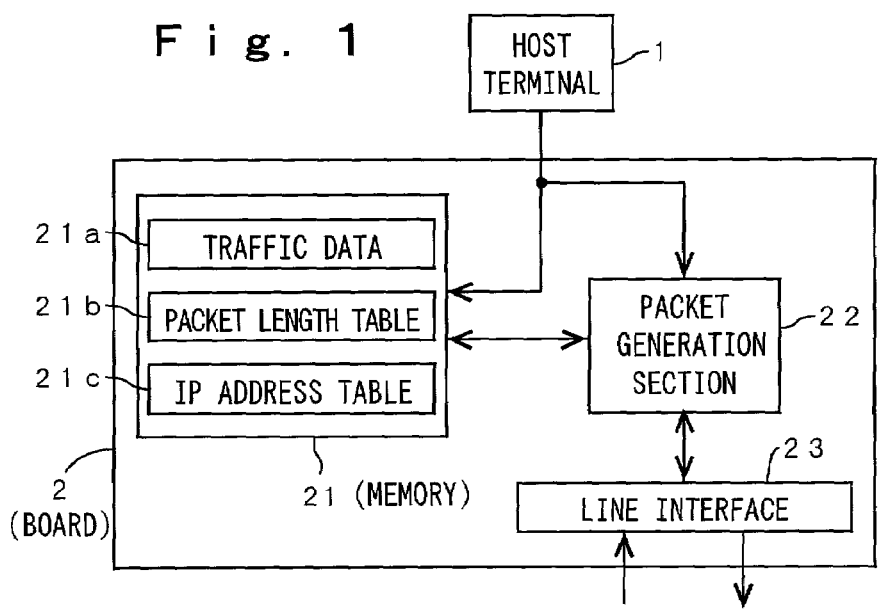
FIG. 1 is a block diagram showing a schematic construction of the present invention.

The present invention will now be described in detail, with reference to the drawings. FIG. 1 is a block diagram showing a construction in one embodiment of the present invention.

A traffic generation apparatus in this embodiment comprises a host terminal 1, and a board 2 for generating an IP packet based on the traffic data and parameters provided from the host terminal 1 and outputting it to a network. On the board 2, there are mounted a memory (storage means) 21, a packet generation section 22, and a line interface (packet transmission means) 23, in a hardware configuration.

The host terminal 1 generates traffic data with long-range dependence characteristics, using an existing computational expression such as FGN (Fractional Gaussian Noise). The generated traffic data comprises at least one of the number of IP packets output per unit time (for example, 100 millisecond, 1000 millisecond) and total number of bytes (in other words, traffic data obtained by numeric conversion of time-varying traffic), and a set value of each parameter (that is, a packet length and IP address) of the generated IP packets.

Figure 2:
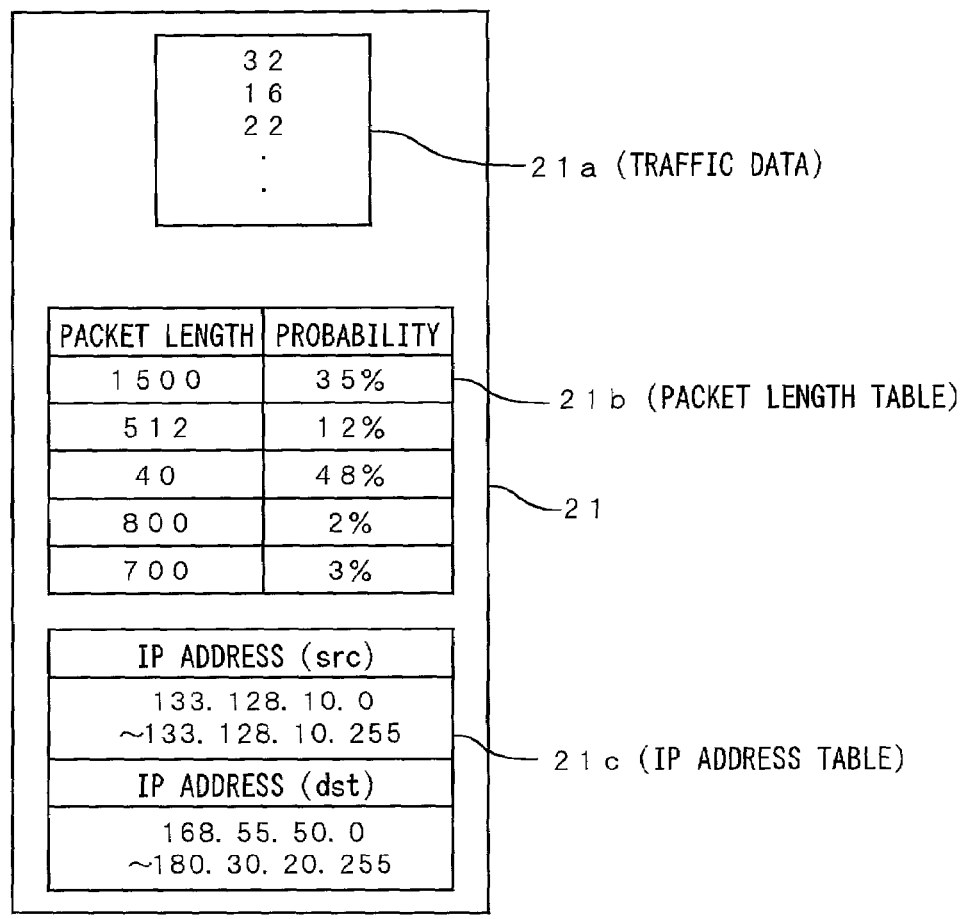
FIG. 2 is a diagram showing an example of data in a memory in FIG. 1.

The memory 21 on the board 2 stores traffic data 21a and a parameter table of the IP packet (a packet length table 21b and an IP address table 21c) transmitted from the host terminal 1, as shown in FIG. 2. The contents of the traffic data 21a indicate the number of IP packets output per unit time. The packet length table 21b consists of a set of packet length and probability, and the contents thereof indicate that the probability of the IP packet having the packet length of, for example, 1500, 512, 40, . . . being generated is 35%, 12%, 48%, . . . , respectively. Moreover, the contents of the IP address table 21c indicate the IP address of a sender and the IP address of a receiver (destination).

Figure 3:
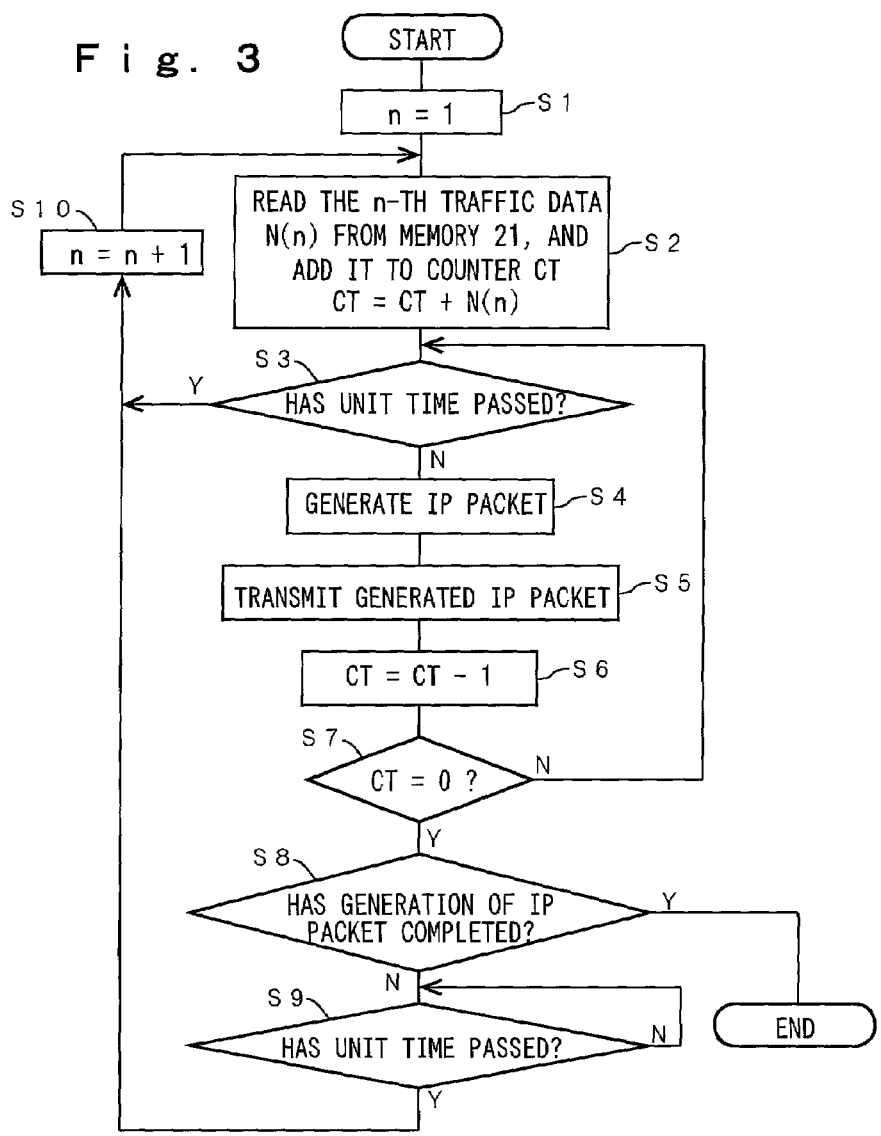
FIG. 3 is a flowchart showing an operation of a packet generation section in FIG. 1.

The packet generation section 22 generates an IP packet, referring to the data and parameters on the memory 21. The operation of the packet generation section 22 will now be described, with reference to the flowchart in FIG. 3.

In step S1, a certain number n is put as n=1, and in step S2, the n-th traffic data N(n) from the traffic data 21a in the memory 21 is read, and added to a counter value CT (not shown). That is to say, processing of CT=CT+N(n) is performed. It begins with a value CT=0. In step S3, it is judged whether the unit time has passed or not, and when this judgment result is NO, control proceeds to step S4, to thereby generate one IP packet. At this time, the length of the IP packet is determined based on the probability of the packet length table 21b.

In step S5, the generated IP packet is transmitted to a network (not shown) built by using a high-speed communication line, with reference to the IP address table 21c. In step S6, 1 is decremented from the counter value CT.

In step S7, it is judged whether the counter value CT becomes 0 or not, and when the judgment result is NO, control returns to step S3, to repeat the above-described processing.

When the judgment result in step S7 becomes YES, that is, when the counter value CT becomes 0, judgment in step S8 is performed, that is, it is judged whether generation of an IP packet has been completed or not. When the judgment result is NO, control proceeds to step S9 to judge whether the unit time has passed or not.

When the judgment result in the above-described step S3 or S9 becomes YES, control proceeds to step S10 to thereby add 1 to n. Then, control proceeds to step S2 to read the (n+1)-th traffic data N(n+1) from the memory 21, and add it to the counter value CT. When the judgment result in step S8 becomes YES, the series of processing is completed.

Figure 4A:
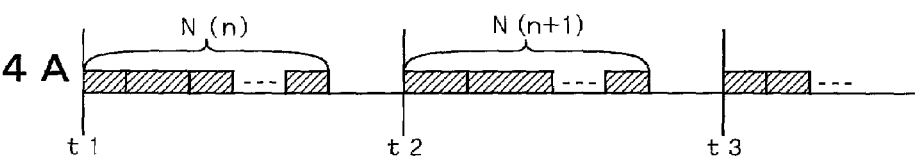
FIGS. 4A and 4B are diagrams showing an example of an output of an IP packet according to this embodiment.
Figure 4B:
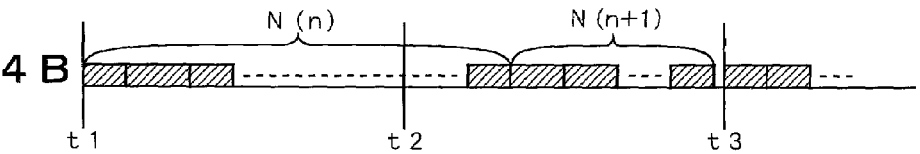

The packet generation section 22 performs the above-described operation, and hence, traffic having a pattern as shown in FIG. 4 is generated from the packet generation section 22. That is to say, as shown in FIG. 4A, when the n-th and the (n+1)-th traffic data N(n) and N(n+1) are transmitted during time shorter than the unit time t1 to t2, and t2 to t3, since the traffic data N(n) and N(n+1) complete transmission within the unit time, the head of each traffic data N(n), N(n+1) is output synchronously with each unit time. However, when the data amount of the traffic data N(n) increases, and the transmission thereof is not completed during the unit time t1 to t2, as shown in FIG. 4B, after the remainder of the traffic data N(n) has been transmitted during the unit time t2 to t3, the next traffic data N(n+1) is successively transmitted. As a result, the IP packets can be generated and transmitted without damaging the long-range dependence characteristics.

As described above, according to this embodiment, IP packets are generated based on the traffic data with long-range dependence characteristics and parameters generated by the host terminal 1, and hence loads close to the real traffic can be supplied to the network. Moreover, since IP packets are generated by the hardware apparatus formed on the board 2, there can be generated traffic with long-range dependence characteristics (IP packet) having a speed corresponding to a high-speed network, which is suitable for use in communication experiments of a network built by using a high-speed communication line, such as 2.5 Gbps or 10 Gbps.

Figures 5, 6:
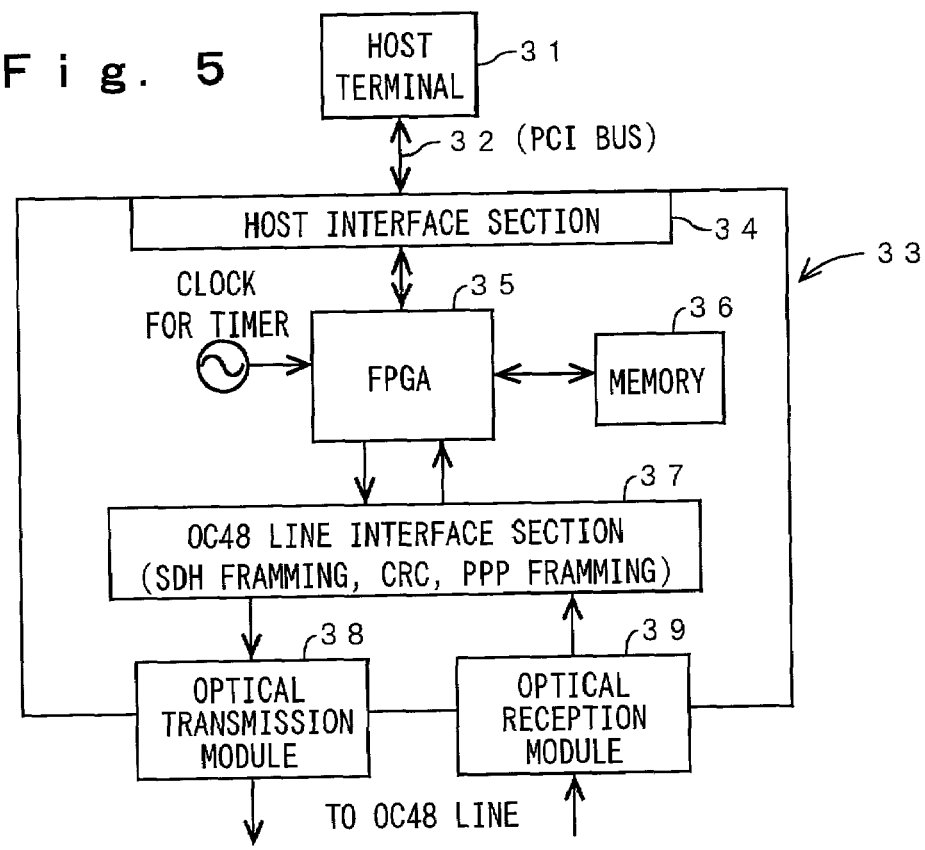
FIG. 5 is a block diagram showing an example of the hardware configuration of the present invention.
FIG. 6 is a diagram showing an example of headers of the IP packet.

FIG. 5 is a diagram showing one example of a hardware configuration of an apparatus for realizing this embodiment. A host terminal 31 is connected to a communication test board 33, via a PCI bus 32. The communication test board 33 comprises a host interface section 34 connected to the PCI bus 32, an FPGA (field program gate array) 35 into which a user logic can be inserted, 32M DRAM memory 36, an OC48 line interface section 37, an optical transmission module 38 and an optical reception module 39. The generated IP packet is transmitted to the network (not shown) via the optical transmission module 38. The FPGA 35 corresponds to the packet generation section 22 in FIG. 1.

FIG. 6 shows one example of headers of the IP packet transmitted to the network. The user data is random numbers, and it is desired that the user specify the seed of random numbers in order to enable reproduction of the test.

As is obvious from the above description, according to the present invention, IP packets can be generated in accordance with the traffic distribution with long-range dependence characteristics. Hence, loads close to the real traffic can be applied to the network. As a result, it becomes possible to measure the behavior of the network at the time of application of the load similar to the actual load, thereby enabling elaborate communication experiments of the network.

What is claimed is:

1. A traffic generation apparatus for generating IP packets, said IP packets having parameters, said traffic generation apparatus comprising:

storage means for storing at least data of traffic with long-range dependence characteristics comprising at least one of the number of IP packets output per unit time and total number of bytes, and a set value of specified parameters of the generated IP packets;

packet generation means for generating IP packets based on said data of traffic with long-range dependence characteristics stored in said storage means; and transmission means for transmitting the IP packets generated by said packet generation means to a network, said transmission means performing transmission without damaging the long-range dependence characteristics, by transferring the transmission of the remainder of the packet in the next unit time, in the case where there is a packet which cannot be transmitted within the unit time.

2. A traffic generation apparatus for generating IP packets, said IP packets having parameters, said traffic generation apparatus comprising:

storage means for storing at least data of traffic with long-range dependence characteristics comprising at least one of the number of IP packets output per unit time and total number of bytes, and a set value of specified parameters of the generated IP packets;

packet generation means for generating IP packets based on said data of traffic with long-range dependence characteristics stored in said storage means; and transmission means for transmitting the IP packets generated by said packet generation means to a network, said transmission means performing transmission without damaging the long-range dependence characteristics, by transferring the transmission of the remainder of the packet in the next unit time, in the case where there is a packet which cannot be transmitted within the unit time, wherein said data of traffic with long-range dependence characteristics is generated by a host terminal and transferred to said storage means.

3. A traffic generation apparatus for generating IP packets, said IP packets having parameters, said traffic generation apparatus comprising:

storage means for storing at least data of traffic with long-range dependence characteristics comprising at least one of the number of IP packets output per unit time and total number of bytes, and a set value of specified parameters of the generated lip packets;

packet generation means for generating IP packets based on said data of traffic with long-range dependence characteristics stored in said storage means; and transmission means for transmitting the IP packets generated by said packet generation means to a network, said transmission means performing transmission without damaging the long-range dependence characteristics, by transferring the transmission of the remainder of the packet in the next unit time, in the case where there is a packet which cannot be transmitted within the unit time, wherein said storage means and said packet generation means are arranged on a board, to generate IP packets at a speed corresponding to a high-speed network.

* * * * *

UNITED STATES PATENT AND TRADEMARK OFFICE
CERTIFICATE OF CORRECTION

PATENT NO.       : 7,151,751 B2
APPLICATION NO.  : 09/954211
DATED            : December 19, 2006
INVENTOR(S)      : Atsushi Tagami et al.

It is certified that error appears in the above-identified patent and that said Letters Patent is hereby corrected as shown below:

<u>On the Title page, Item (73): Assignee</u>

The Assignee Name should read, --KDDI Corporation--.

Signed and Sealed this

Eighth Day of May, 2007

JON W. DUDAS
*Director of the United States Patent and Trademark Office*